United States Patent [19]
Lamberet

[11] 3,891,484
[45] June 24, 1975

[54] EQUIPMENT FOR MANUFACTURING STRATIFIED ISOTHERMAL PANELS

[76] Inventor: Paul Lamberet, Vonnas-Ain, France

[22] Filed: Sept. 6, 1973

[21] Appl. No.: 394,717

Related U.S. Application Data

[63] Continuation-in-part of Ser. No. 248,538, April 28, 1972, Pat. No. 3,834,968.

[30] Foreign Application Priority Data
May 9, 1973   France ............................ 73.17424

[52] U.S. Cl. ..................... 156/60; 104/48; 104/88; 156/557; 156/563; 156/584; 161/161; 269/56
[51] Int. Cl. ............................................ B32b 31/04
[58] Field of Search ................. 269/56; 104/88, 48; 156/500, 557, 559, 563, 566, 584; 432/241; 161/161

[56] References Cited
UNITED STATES PATENTS

| | | |
|---|---|---|
| 1,054,040 | 2/1913 | Scott .............................. 432/241 X |
| 2,709,864 | 6/1955 | Gulbrandsen .................. 156/299 X |
| 3,556,011 | 11/1971 | Saxdnmeyer ...................... 104/48 |
| 3,616,090 | 10/1971 | Larson ............................ 156/563 |
| 3,671,355 | 6/1972 | Paymal ......................... 156/555 X |
| 3,704,883 | 12/1972 | Don ............................... 156/556 X |
| 3,732,992 | 5/1973 | Busam ............................ 104/48 X |

*Primary Examiner*—Edward G. Whitby

[57] ABSTRACT

Apparatus for manufacturing isothermal panels of the sandwich or stratified type and comprising two parallel adjacent tracks along which platforms are adapted to travel. Transfer devices are provided at the ends of said tracks for transferring the platforms from one track to the other, and a plurality of treatment stations are disposed along said tracks including a tubular oven near the end of said outward bound track and rollers for overturning the sheet being treated during a transfer from one track to the other. These rollers include vertical and horizontal rollers for guiding the sheet and preventing same from corrugating.

7 Claims, 2 Drawing Figures

PATENTED JUN 24 1975

3,891,484

EQUIPMENT FOR MANUFACTURING STRATIFIED ISOTHERMAL PANELS

OTHER APPLICATIONS

This application is a continuation-in-part of my earlier application Ser. No. 248,538 filed Apr. 28, 1972 and now U.S. Pat. No. 3,834,968 the disclosure of which is embodied herein as though fully set forth.

BACKGROUND

1. Field of the Invention

This invention relates in general to the manufacture of isothermal panels of stratified material or panels having a sandwich structure comprising, for example, a core of rigid expanded material such as polyurethane sandwiched between two sheets of stratified material such as a polyester, such panels being suitable for constructing isothermal bodies and containers, notably for refrigerated vehicles.

2. Prior Art

In U.S. Pat. application Ser. No. 248,538 filed Apr. 28, 1973 (now U.S. Pat. No. 3,834,968) is described typical apparatus for manufacturing panels of this type. This apparatus comprises:

- a pair of parallel tracks along which platforms of a size consistent with those of the panels to be manufactured are adapted to travel, each platform being mounted on a carriage; at each end of said track there being a transfer station for transferring the platforms from one track to the other, and a plurality of treatment stations disposed in succession along the first or outward track, namely:
- a lay-down station for distributing in succession and continuously on each platform a resin mixture and textile reinforcement which are intended for constituting one of the stratified sheets of an isothermal panel;
- a tubular oven comprising means for pressing the panels on the platform and heating means for accelerating the polymerization of the resin mixture, and
- a station for stripping the panels finished on at least one face.

Although this apparatus is suitable for the continuous manufacture of panels of the kind set forth hereinabove, it is adapted to cover only one face of the panels with a stratified sheet. When it is desired to cover both faces of the panel, the latter must be returned to the starting point of the outward section where the panel is firstly turned upside-down and then covered again.

SUMMARY OF THE INVENTION

It is an object of the present invention to provide an improved form of apparatus as described above and as disclosed in U.S. Pat. No. 3,834,968 and in which the two faces of a panel of a stratified sheet can be covered simultaneously.

According to the invention, there is provided on the platform return section or track, another lay-down station adapted to distribute continuously to each platform a resin mixture and the reinforcing textile element for constituting the second stratified sheet of an isothermal panel, and means capable of transferring continuously said second sheet from one track to the other by overturning the same to bring it to a position located between the expanded plate lay-down station and a tubular oven.

The two faces of a panel are thus covered in a single pass and consequently the efficiency of the equipment is substantially doubled with only a very small increment in the necessary personnel being possibly required.

According to a preferred embodiment of this invention, the means provided for continuously transferring the second stratified sheet from one track to the other by overturning said sheet comprise guide rollers disposed along the edges of both tracks, where the sheet leaves the return track and where it engages the outward track, the sheet following a helical path from one track to the other.

Advantageously, these rollers have vertical axes. Other pairs of superposed rollers having horizontal axes, capable of retaining the sheet between their nips, are provided upstream and downstream of said vertical rollers, to prevent any waving or corrugation effect likely to impair the gluing operation.

The aforesaid patent application describes a specific apparatus wherein, along the return track, a platform washing station, and finally a second gel-coat spraying water-proofing the panel surfaces are provided. To adapt this specific equipment to the present invention, there is provided, along said return track and in succession, a first platform washing station, a first gelcoat spraying station, the station for laying down a stratified material, the means for transferring the stratified sheet from one track to the other track, a second platform washing station, and finally a second gelcoat spraying station. By overturning the stratified sheet, the gelcoat is sprayed onto its upper surface.

BRIEF DESCRIPTION OF THE DRAWING

A typical embodiment of the present invention will next be described with reference to the attached drawing, in which.

DETAILED DESCRIPTION

Figure 1:
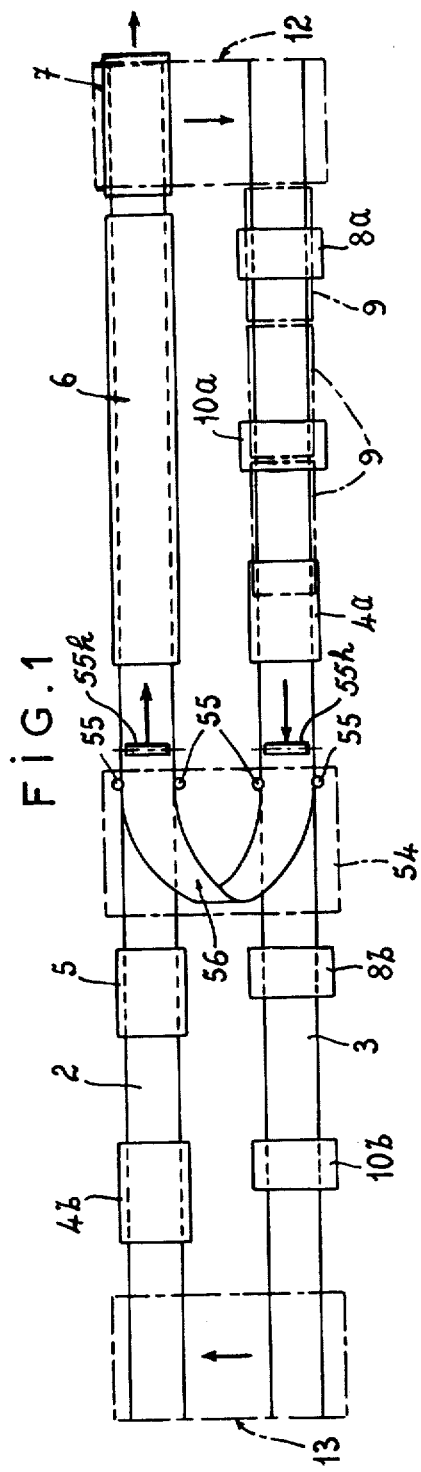
FIG. 1 is a diagrammatical plane view from above showing the general arrangement of the equipment with its various stations.

Referring first to FIG. 1, which illustrates the equipment in general, the main component elements, which are also described and illustrated in the aforesaid prior patent application are shown, i.e. the two parallel "outward" and "return" tracks 2 and 3 respectively on which the tables or platforms 9 are adapted to travel. The outward track comprises a lay-down station 4b for laying down a sheet of stratified material, a lay-down station 5 for laying down an insulating panel of expanded material, a tubular oven 6 and a panel stripping station 7.

The return track 3 is equipped with means for automatically washing the platforms, as shown at 9, and other means for spraying a gelcoat onto said platform for water-proofing the surfaces of the stratified panel.

Two devices 12 and 13 are provided for transferring the tables 9 from the end of the outward track 2 to the beginning of the return track 3, and then from the end of this return track 3 to the beginning of the outward track 2.

The width of these platforms is consistent with the greatest width of the panels to be manufactured and throughout the length of each rectilinear section of said tracks the plaforms are in end-to-end abutting relationship so as to constitute a kind of continuous strip or tape. Drive means are provided for propelling all of the platforms at a constant rate while maintaining said platforms in mutual end-to-end contact along said sections.

A detailed description of the construction and structure of these various stations is not deemed necessary herein, since it is given exhaustively in said prior patent application.

According to the present invention, a number of additional stations are provided for covering simultaneously the two faces of a panel with a stratified sheet.

Disposed alongside the return track 3 are provided in succession a first station 8a for washing the platforms, a first station 10a for spraying a gel-coat, a station 4a for laying down a sheet of stratified material, a station 54 for transferring this sheet to the outward track 2, a second station 8b for washing the platforms, and finally, a second station 10b for spraying a gelcoat.

The station 4a for laying down a sheet of stratified material is adapted to distribute in succession and continuously to each platform a resin mixture and the textile reinforcement necessary for constituting one of the two stratified sheets covering a panel.

The station 54 whereat this sheet is transferred from one track to the other parallel track comprises means adaped to transfer this sheet continuously while overturning the same to bring this sheet between a lay-down station 5 whereat the plates of expanded material are laid down and the inlet end of the tubular oven 6.

Figure 2:
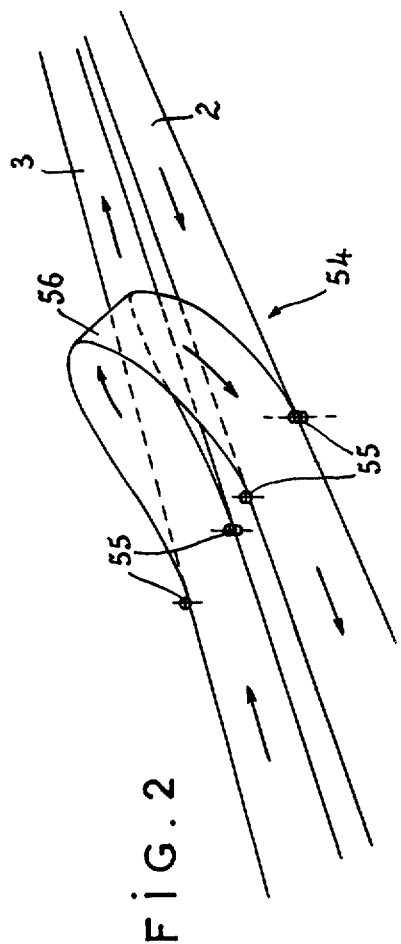
FIG. 2 is a fragmentary perspective view showing the zone where the stratified sheet is transferred from one track to the other track.

These means, shown in relatively greater detail in FIG. 2, comprise grooved guide rollers 55 having vertical axes and disposed between the edges of the two tracks 2 and 3, on the one hand at the location where the sheet 56 leaves the return track 3 and on the other hand where the same sheet 56 engages the outward track 2. Between these two locations, the sheet 56 is caused to move along a helical path. In other words, it is overturned, its underside becomes the upperside, and the sheet is then re-started in the opposite direction. These rollers 55 may be associated with pairs of superposed rollers 55h having horizontal axes and disposed upstream and downstream with respect to said rollers 55. As the sheet engages the nips formed between the rollers of each pair, it is prevented from being corrugated or undulated, as this would likely impair the subsequent gluing operation.

The lower face of a panel is accomplished exactly as in the case of the operation described in the aforesaid prior patent application. Shortly before completing their return travel, the platforms 9 travel in succession under the washing station 8b and the gelcoat spraying station 10b. After transferring the platforms to the outward track 2, the stratified sheet is laid continuously on the platforms 9 traveling under the lay-down station 4b. These platforms 9 covered with the stratified sheet subsequently pass under the station 5 where they receive an insulating panel. Each platform having thus received its insulating panel is then directed through the tubular oven 6. As they emerge from this oven, the panels are directed under the stripping station 7. The platforms 9 released from station 7, i.e. at the end of the outward track 2, are transferred to the return track 3.

Superposed to these operations already described in detail in said prior patent application are other operations directed to cover the upper face of each panel while the lower face thereof is being covered. After transferring the platforms 9 to the return track 3, these platforms are directed successively under the washing station 8a, under the gel-coat spraying station 10a and finally under station 4a whereat a sheet of stratified material is laid down, so that the upper face of the panel can be coated along the return track of said platforms 9. At the transfer station 54, the sheet 56 is brought to the outward track 2 and turned upside down so that the gelcoat lies atop of said sheet. Having thus been brought to a location between the plate lay-down station 5 and the tubular oven 6, the second sheet 56 is glued to the panels and introduced into this oven 6, in which it is pressed by the presser roller. Of course, this mode of operation, the original feature of which lies in the making of the sheet on the return track 3, and the stripping and re-gluing thereon on the other track 2 along which the sheet travels in the opposite direction, can be obtained only if the platforms 9 travel at strictly the same rate along the two tracks.

As noted above, the object of the invention is to allow each panel to be provided with two cover plates in a single pass through the plant.

For that purpose, the purpose of stations 8a to 4a is the formation of a continuous strip of fiberglass reinforced resin which is stripped from the tables by rollers 55 and twirled at 56 and laid down again upstream of the oven 6 so as to cover the top surface of the core panel with cellular material which is deposited at station 5.

Stations 8b and 10b are for washing the tables and preparing another layer of resin so as to form the covering plate of the lower face of the cellular panel forming the core of the sandwich panel, which is brought into the plant at station 5.

Successive panels connected between themselves by their top and bottom cover plates are therefore introduced into oven 6, since these plates are manufactured in series when the panels forming the cores are cut off before their introduction into the plant.

At the delivery end of oven 6 and before their withdrawal from the plant, each sandwich panel must be separated from the panel following it by a cutting to length of its top and bottom covering plates. This operation can be effected by hand since the saw doing the cutting to length must make a transverse movement relative to the moving of the tables issuing from oven 6, and also a lengthwise movement since the movement of said tables takes place continuously. Rollers 55 are always in action.

The horizontal rollers secure the grip of the fiberglass reinforced resin ribbon at the instant of its stripping from the table (upstream of station 54) as well as at the instant of its laydown on the top surface of the plate of cellular material forming the core of the substance, namely upstream of oven 6.

Only the fiberglass reinforced resin band is stripped off the tables at station 54, twisted and laid on again upstream of the oven station 6, this band remaining relatively flexible since it has not yet been polymerized by heat treatment in oven 6.

The panels composed of a rigid core of cellular (expanded polyurethane) material and covered over with two sheets of fiberglass reinforced resin hardened by polymerization in oven 6 constitute rigid panels.

The invention is not to be construed as being strictly limited to the single embodiment described hereinabove and illustrated in the acompanying drawing, which is given by way of illustration, not of limitation. On the contrary, it includes all possible modifications and variations that will come to the mind of those skilled in the art without departing from the basic principle of the invention as set forth in the appended claims.

What is claimed is:

1. Apparatus for manufacturing isothermal panels of stratified matrial, which comprises a pair of parallel adjacent tracks including an outward track and a return track, platforms adapted to travel along said tracks, transfer means at the ends of said tracks for transferring said platforms from one track to the other track, a tubular oven adjacent one end of said outward track, and a plurality of treatment stations disposed along said tracks, one of said stations being located upstream of said oven and being adapted for laying expanded material on said platforms, another of the stations being disposed on said return track and being adapted to distribute successively and continuously to each platform on the return track a resin mixture and a textile reinforcement for constituting a stratified sheet of an isothermal panel, and means for continuously transferring said panel from said return track to the outward track by overturning said panel by guiding the same through a helical path, to bring said panel to a location disposed between the station where the expanded material is laid down and the tubular oven with the panel being superposed on the expanded material.

2. Apparatus as set forth in claim 1, wherein said means for continuously transferring the isothermal panel from the return track to the outward track while overturning the same comprises guide rollers disposed along the edges of both tracks where said panel leaves the platforms on the return track and where said panel is superposed on said outward track.

3. Apparatus as set forth in claim 2, wherein said guide rollers have vertical axes, further comprising rollers having horizontal axes and superposed on the panel adjacent the guide rollers to retain the panel in the guide rollers for preventing corrugation of the panel which might impair the gluing thereof.

4. Apparatus as set forth in claim 3, wherein said stations include a first platform washing station disposed along the return track, a first station for spraying gelcoat disposed along the outward track, a second platform washing station disposed along the return track, and a second gelcoat spraying station disposed along said return track.

5. Apparatus as set forth in claim 2 wherein the guide rollers are provided with grooves to accommodate the side edges of the panel.

6. Apparatus as claimed in claim 1, comprising means for laying an isothermal panel on said platforms on said outward track and in a position to be covered by said expanded material.

7. A method for using apparatus for manufacturing isothermal panels of stratified material, said apparatus including an outward track and a return track, said method comprising laying expanded material on said outward track for conveyance therealong, continuously distributing a resin mixture and the textile reinforcement for constituting a stratified sheet of an isothermal panel on said return track for conveyance partly therealong, and continuously transferring said isothermal panel from said return track to the outward track, by overturning said isothermal panel, to superpose said isothermal panel on said material for conveyance therewith along said outward track, the isothermal panel being reversed through 180° both in direction of travel and in spatial attitude between the respective tracks.

* * * * *